United States Patent [19]
Teggatz et al.

[11] Patent Number: 5,821,701
[45] Date of Patent: Oct. 13, 1998

[54] BOOST REGULATOR CIRCUIT WITH STOARGE CAPACITOR FOR REDUCED POWER CONSUMPTION

[76] Inventors: Ross Teggatz, 2908 Stonepointe, McKinney, Tex. 75070; Rex Teggatz, 1307 S. Bowser, Richardson, Tex. 75081

[21] Appl. No.: 651,173

[22] Filed: May 21, 1996

[51] Int. Cl.$^6$ ........................................... H05B 37/02
[52] U.S. Cl. .................. 315/307; 315/169.3; 315/209 R; 315/224
[58] Field of Search ............................ 315/209 R, 169.3, 315/226, 224, 307, 239, 291, 200 R, 219

[56] References Cited

U.S. PATENT DOCUMENTS

| | | | |
|---|---|---|---|
| 5,502,357 | 3/1996 | Kimball | 315/209 R |
| 5,568,016 | 10/1996 | Beard | 315/169.3 |

*Primary Examiner*—Robert J. Pascal
*Assistant Examiner*—David H. Vu
*Attorney, Agent, or Firm*—W. James Brady, III; Richard L. Donaldson

[57] ABSTRACT

A method of improving efficiency in a boost regulator circuit includes the steps of transferring energy stored in a load to an energy storage component and transferring energy back from the energy storage component to the load. This method may be actuated in a boost regulator circuit having a first energy storage component, means for initiating and discontinuing energy storage in the first energy storage component, a capacitive load, a bi-directional drive circuit coupled to the first energy storage component, a second energy storage component coupled to the drive circuit, and means for transferring energy between the capacitive load and the second energy storage component, wherein when the voltage having a first polarity across the capacitive load reaches a predetermined voltage it transfers the energy in the capacitive load to the second energy storage component and subsequently transfers the energy back to the capacitive load in the second polarity, thereby conserving energy and substantially reducing power consumption of the boost regulator circuit.

9 Claims, 8 Drawing Sheets

BOOST REGULATOR CIRCUIT WITH STOARGE CAPACITOR FOR REDUCED POWER CONSUMPTION

FIELD OF THE INVENTION

This invention relates to electronic circuits and more particularly relates to boost regulator circuits.

BACKGROUND OF THE INVENTION

The use of backlighting for a multitude of displays has increased over the years. Various methods of providing backlighting have been used. One solution utilizes an electroluminescent (EL) driving scheme. FIG. 1 illustrates a prior art boost regulator circuit 10 for driving a backlight (EL load $C_L$) as taught in U.S. Pat. No. 4,527,096 assigned to Timex Corporation. Bacldight ($C_L$) is a capacitive load. Prior art boost regulator circuit 10 drives the EL load $C_L$ by periodically pulsing a drive transistor M1 on and off. Each time M1 is turned on, the current through an inductor 22 increases (as shown for $I_{DRAIN(M1)}$ at times $t_0$-$t_1$ of prior art FIG. 8). Each time M1 is turned off energy in inductor 22 (approximately $½LI^2$) is dumped through a diode 20 into EL load, $C_L$, through an H-bridge circuit of transistors M2, M3, M4 and M5. The dumping of energy from inductor 22 to EL load $C_L$ is illustrated by the flyback voltage on $V_{DRAIN(M1)}$ at time interval $t_2$$t_1$ of prior art FIG. 8. Each time energy from inductor 22 is transferred to EL load $C_L$ the voltage across $C_L$ is "boosted." After a predetermined number of boosts (determined by an oscillator circuit 12 and a divider circuit 14), EL load $C_L$ is driven in the opposite direction by the. H-bridge circuit and the boosting process begins again. Oscillator circuit 12 drives drive transistor M1. A divider circuit 14 divides the oscillator signal by a predetermined number ("N") and uses that signal to switch the conduction path of the H-bridge circuit. In one conduction path, transistor M2 and M5 are conducting and current flows through M2, through EL load $C_L$ and through M5 to circuit ground. In a second conduction path, current flows through M4, through EL load $C_L$ and through M3 to circuit ground. Circuit 10 drives EL load $C_L$ in both directions causing an ac voltage signal to be seen across the EL load, thus creating luminance.

The voltage across $C_L$ in the prior art boost regulator circuit 10 is illustrated in prior art FIG. 7. Each "boost" (illustrated by a step in prior art FIG. 7) in the voltage across EL load $C_L$ represents the moment drive transistor M1 turns off and the energy in inductor 22 is transferred to EL load $C_L$. In this example, the direction which EL load $C_L$ is driven is switched every seven conduction cycles of M1. Therefore divider circuit 14 is a "divide-by-seven" divider circuit ("N"=7). The voltage waveform across EL load $C_L$, as illustrated in prior art FIG. 7, therefore appears to be approximately a triangle or sawtooth waveform. The RMS value of the waveform of FIG. 7 is directly proportional to the luminance of backlight $C_L$. ($RMS_{FIG. 7} \propto $Luminance $(C_L)$).

It is an object of this invention to provide an improved boost regulator circuit having substantially better efficiency than prior art boost regulator circuits.

It is another object of this invention to provide an improved boost regulator circuit having substantially better performance than prior art boost regulator circuits. Other objects and advantages of the invention will become apparent to those of ordinary skill in the art having reference to the following specification together with the drawings herein.

SUMMARY OF THE INVENTION

A method of improving efficiency in a boost regulator circuit includes the steps of transferring energy stored in a load to an energy storage component and transferring energy back from the energy storage component to the load. This method may be actuated in a boost regulator circuit having a first energy storage component, means for initiating and discontinuing energy storage in the first energy storage component, a capacitive load, a bi-directional drive circuit coupled to the first energy storage component, a second energy storage component coupled to the drive circuit, and means for transferring energy between the capacitive load and the second energy storage component, wherein when the voltage having a first polarity across the capacitive load reaches a predetermined voltage it transfers the energy in the capacitive load to the second energy storage component and subsequently transfers the energy back to the capacitive load in the second polarity, thereby conserving energy and substantially reducing power consumption of the boost regulator circuit.

DESCRIPTION OF THE INVENTION

Figure 1:
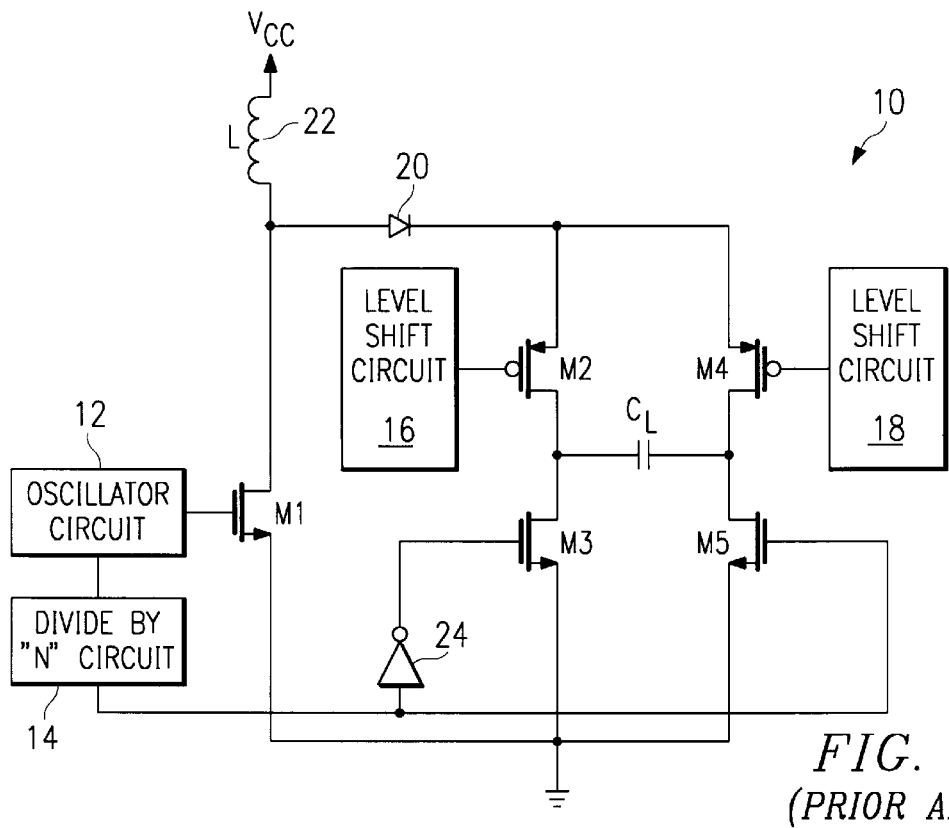
FIG. 1 is a prior art combined block/schematic diagram illustrating a boost regulator circuit 10.
Figure 7:
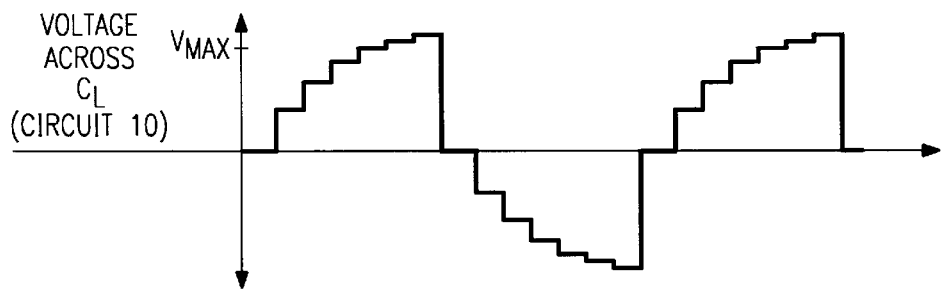
FIG. 7 is a timing diagram illustrating the voltage waveform across an EL load, $C_L$, over time for prior art boost regulator circuit 10 of FIG. 1.

Prior art boost regulator circuit 10 of FIG. 1 is inefficient in driving EL load $C_L$ in several respects. Oscillator circuit 12 of FIG. 1 blindly drives transistor M1 resulting in the voltage and current waveforms shown in prior art FIGS. 7 and 8. When a gate terminal of M1 goes high (at time $t_0$), M1 conducts and current through inductor 22 and transistor M1 increases linearly initially. Then, the inductor saturates, causing the current to increase in a non-linear fashion and afterwards begins to be limited by the series resistance associated with the inductor. The voltage across M1 during conduction is negligible and represents the drain current multiplied by the Rds(on) of M1. M1 remains in conduction regardless of whether the current is being limited by the inductor characteristics and is controlled only by oscillator circuit 12. This is an inefficient method of storing energy in the conductor. When the gate of M1 goes low (at time $t_1$), M1 turns off and inductor 22 (not wanting to stop conducting current) produces an inductive flyback voltage at the drain of M1. This flyback voltage exists at the drain of M1 until the energy stored in inductor 22 ($\frac{1}{2}[LI^2]$) is transferred to EL load $C_L$ (at time $t_2$). At time $t_2$ the current through inductor 22 is approximately zero. Then, between time $t_2$ and $t_3$ nothing occurs while boost regulator circuit 10 waits for oscillator 12 to drive the gate of M1 high thereby turning M1 on and causing the energy transfer process to repeat. Prior art FIG. 7 illustrates the voltage across EL load $C_L$. Note that the voltage across $C_L$ increases in a periodic manner and that load $C_L$ is switched almost as soon as the maximum voltage ($V_{MAX}$) is reached across load $C_L$. This resulting triangular or sawtooth waveform provides an indication of circuit 10's efficiency. The RMS voltage of the waveform of FIG. 7 is proportional to the luminance of the backlight. If the RMS voltage can be made larger without additional energy transfers from inductor 22 to load $C_L$ then a more efficient circuit would exist because more luminance would be provided without a substantial increase in power dissipation. Alternatively, a circuit could be provided that would provide approximately the same luminance as prior art circuit 10 with substantially less power dissipation thereby saving battery life.

Figure 9:
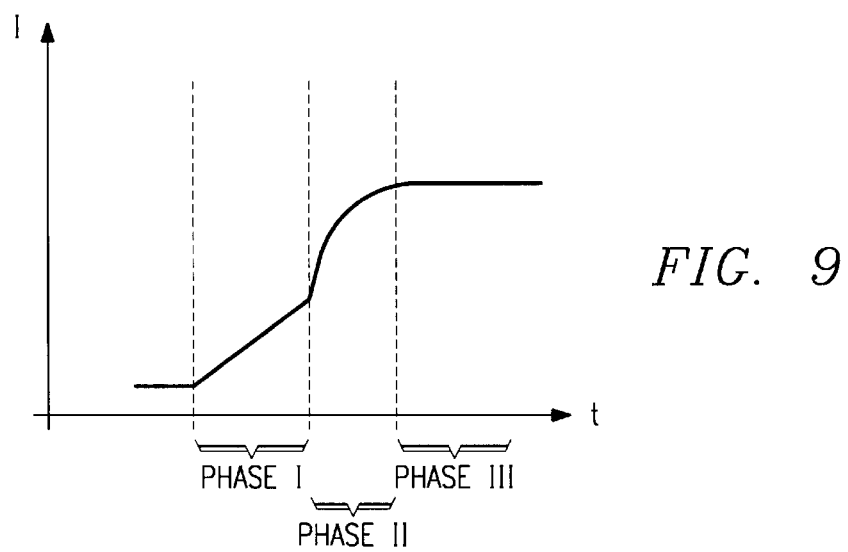
FIG. 9 is a graph illustrating the non-ideal characteristics of inductor 22.
Figure 9A:
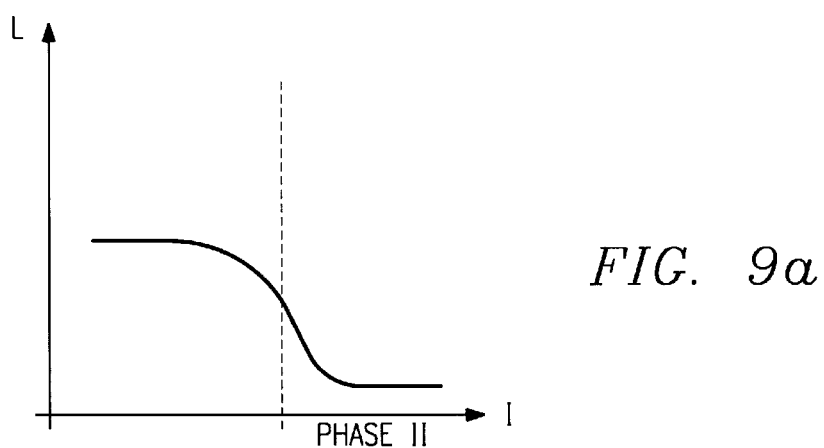
FIG. 9a is a graph illustrating the relationship between inductance and current in inductor 22.

Another deficiency of prior art boost regulator circuit 10 that hurts its efficiency is that circuit 10 does not adjust itself depending upon changes in inductor 22. As is well known in the art of circuit design, the energy stored in an inductor is calculated by $\frac{1}{2}(LI^2)$. Therefore for a limited value of L (inductance) and I (current) the energy stored in inductor 22 can be maximized. Further, as is well known by those skilled in the art of circuit design, non-ideal inductors do not linearly conduct current over time, but rather follow the current waveform illustrated in FIG. 9. In the linear region (phase I) the current rises linearly through inductor 22 and inductor 22 acts like an ideal inductor. In the saturation region (phase II) the current slope increases dramatically. As the current increases further inductor 22 reaches the resistive limited region (phase II) where the winding inductance of inductor 22 limits any further increases in current. Because current and inductance are inversely proportional to one another as shown in FIG. 9a it becomes clear that to maximize the magnetic energy stored in inductor 22 one should keep inductor 22 in the linear region (phase I) and out of the saturation and resistive limited regions (phases II and III). Further, process variations exists from one inductor to another; therefore even in a circuit optimized to transfer the maximum energy from one inductor, efficient energy transfer cannot be assured for all inductors. Therefore, if one can monitor the current through inductor 22 and ensure that energy is transferred while in the linear region (phase I) then the efficiency of the circuit would increase.

Figure 2:
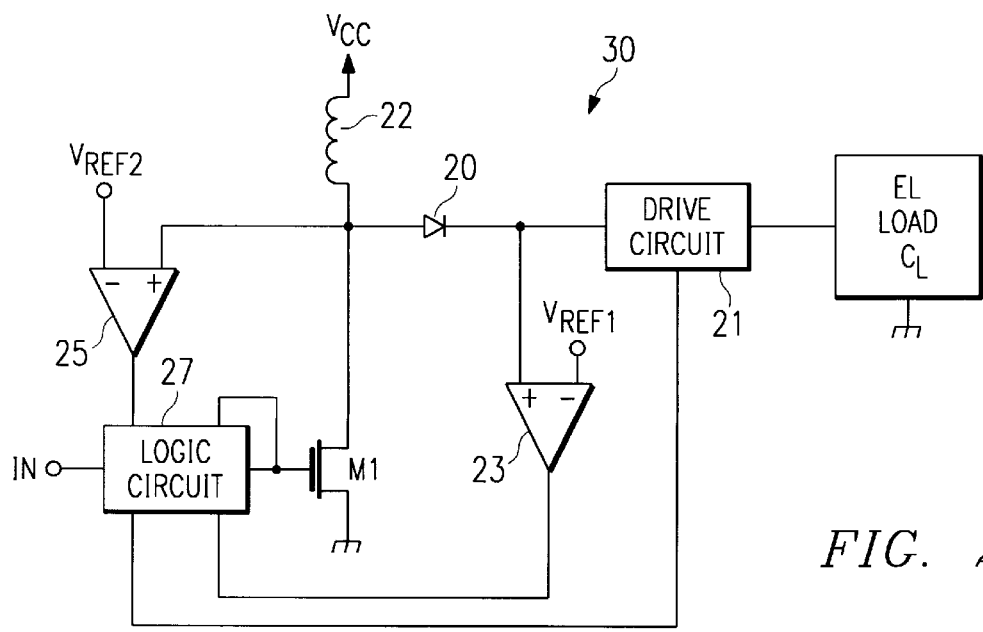
FIG. 2 is a combined block/schematic diagram illustrating an embodiment of the invention, an improved boost regulator circuit 30.

FIG. 2 is a combined block/schematic diagram illustrating the preferred embodiment of the invention, an improved boost regulator circuit 30. Circuit 30 has a drive transistor M1 coupled in series with inductor 22 between a voltage supply potential Vcc and a circuit ground potential. A diode 20 has an anode connected to a drain terminal of M1 and a cathode connected to a drive circuit 21. Drive circuit 21 is connected to EL load $C_L$ and to a positive input terminal of a first comparator 23. First comparator 23 has a negative input terminal coupled to a first reference voltage $V_{REF1}$ and an output connected to a logic circuit 27. Logic circuit 27 is connected to a gate terminal of M1. A second comparator 25 has a positive input terminal connected to the drain of M1 and a negative input terminal connected to a second reference voltage $V_{REF2}$. Second comparator 25 has an output connected to logic circuit 27. An input (labelled IN) is also connected to logic circuit 27. Improved boost regulator circuit 30 drives EL load $C_L$ more efficiently than prior art boost regulator circuit 10 by monitoring the voltage across inductor 22 and EL load $C_L$, and driving M1 in response to the monitoring of those voltages.

Figure 3:
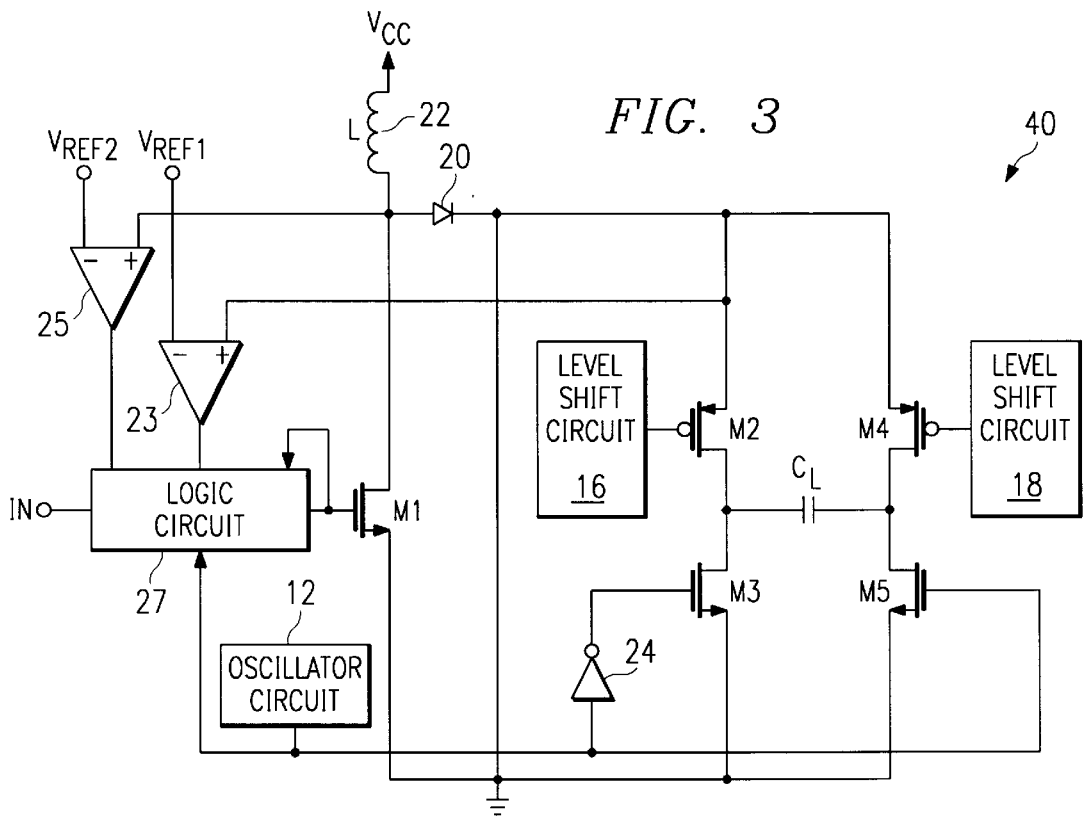
FIG. 3 is a combined block/schematic diagram illustrating an alternative embodiment of the invention.

FIG. 3 is a combined block/schematic diagram illustrating an alternative embodiment of the invention, a boost regulator circuit 40. Circuit 40, like circuit 30 of FIG. 2, has logic circuit 27 that drives transistor M1 which is coupled in series with inductor 22. Diode 20 is connected to the drain of M1 and feeds an H-bridge circuit including transistors M2, M3, M4 and M5. An oscillator circuit 12 is connected to a first level shift circuit 16 through an inverter 24 and a second level shift circuit 18. First level shift circuit 18 is connected to the gate terminal of transistor M2 and second level shift circuit 18 is connected to the gate terminal of transistor M4. First comparator 23 has a positive terminal input connected to the cathode of diode 20 and second comparator 25 has a positive terminal input connected to the drain of transistor M1. The outputs of first comparator 23 and second comparator 25 are connected to logic circuit 27. Circuit 40 illustrates a particular embodiment that will provide bi-directional drive for EL load $C_L$ and also illustrates that the voltage across EL load $C_L$ can also be effectively monitored by first comparator 23 by monitoring the voltage at the cathode of diode 20.

Figure 4:
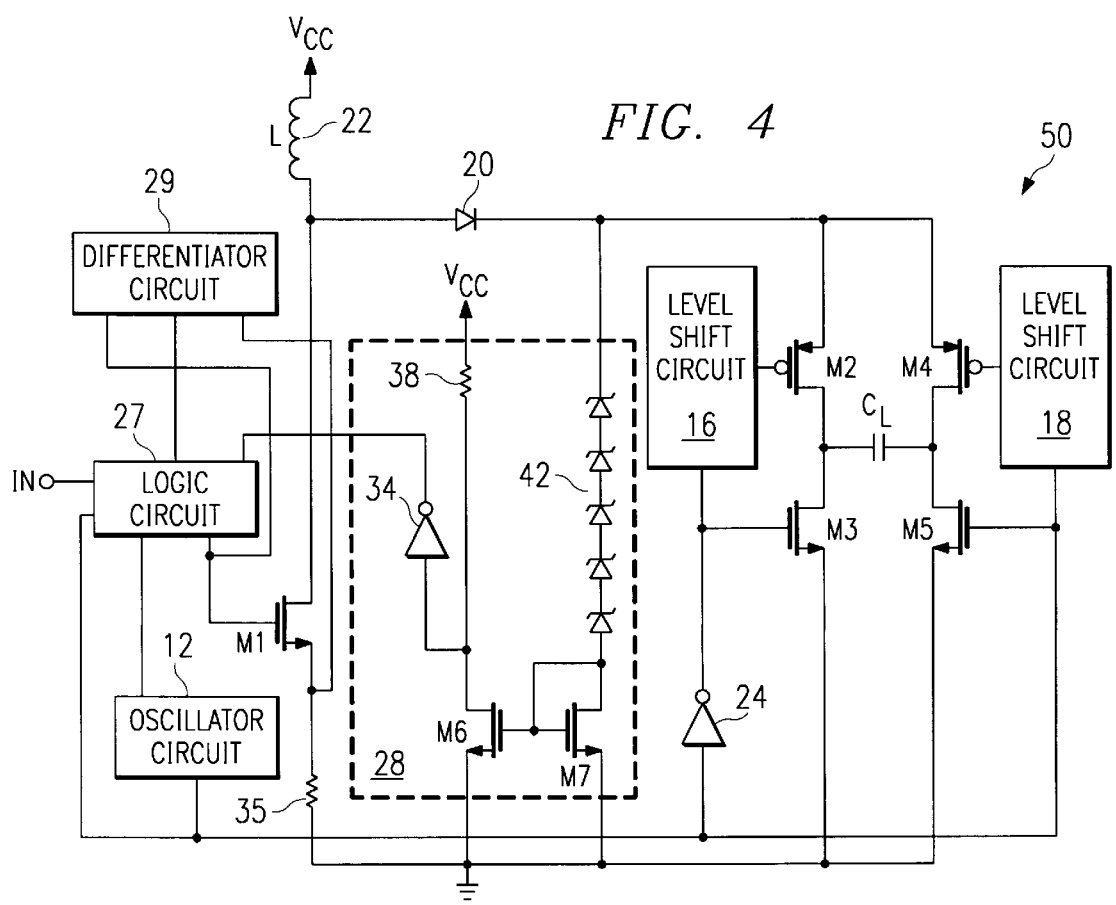
FIG. 4 is a combined block/schematic diagram illustrating another alternative embodiment of the invention.

FIG. 4 is a combined block/schematic diagram illustrating another alternative embodiment of the invention, a boost regulator circuit 50. Circuit 50 is substantially similar to FIG. 3 with the exception that a voltage monitoring circuit 28 has replaced first comparator 23 and a differentiator circuit 29 has replaced second comparator 25. Voltage monitoring circuit 28 and differentiator circuit 29 illustrate that their are a plethora of methods of monitoring the voltage across EL load $C_L$ and status of inductor 22. All methods of monitoring the voltage across EL load $C_L$ and status of inductor 22 to thereby improve the efficiency of energy transfer to EL load $C_L$ fall within the scope of this invention.

Figure 5:
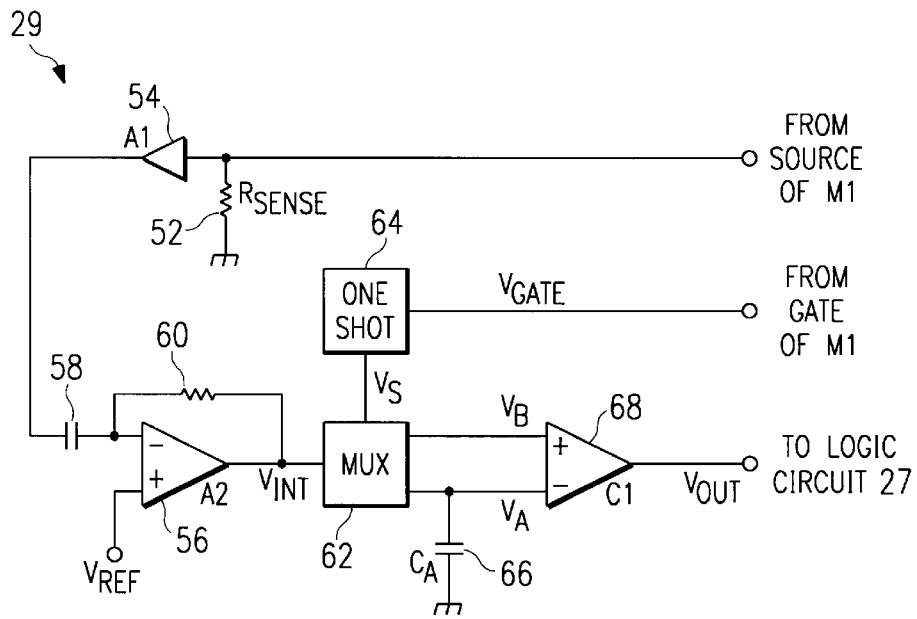
FIG. 5 is a combined block/schematic diagram illustrating a differentiator circuit 29.

FIG. 5 is a schematic diagram illustrating differentiator circuit 29 of FIG. 4. Differentiator circuit 29 has a resistor $R_{sense}$ 52 connected to the source of M1. $R_{sense}$ 52 is also connected to a first amplifier A1 54. The output of A1 54 is connected to a differentiator amplifier A2 56. The output of A2 56 is then connected to an analog multiplexer circuit, MUX 62. MUX 62 is controlled by the output of a one-shot monostable circuit 64, which are well known by those skilled in the art. The one-shot 64 has its input connected to the gate of M1. The two outputs of MUX 62 are connected to the positive and negative inputs to comparator circuit C1 68 respectively.

Figure 6:
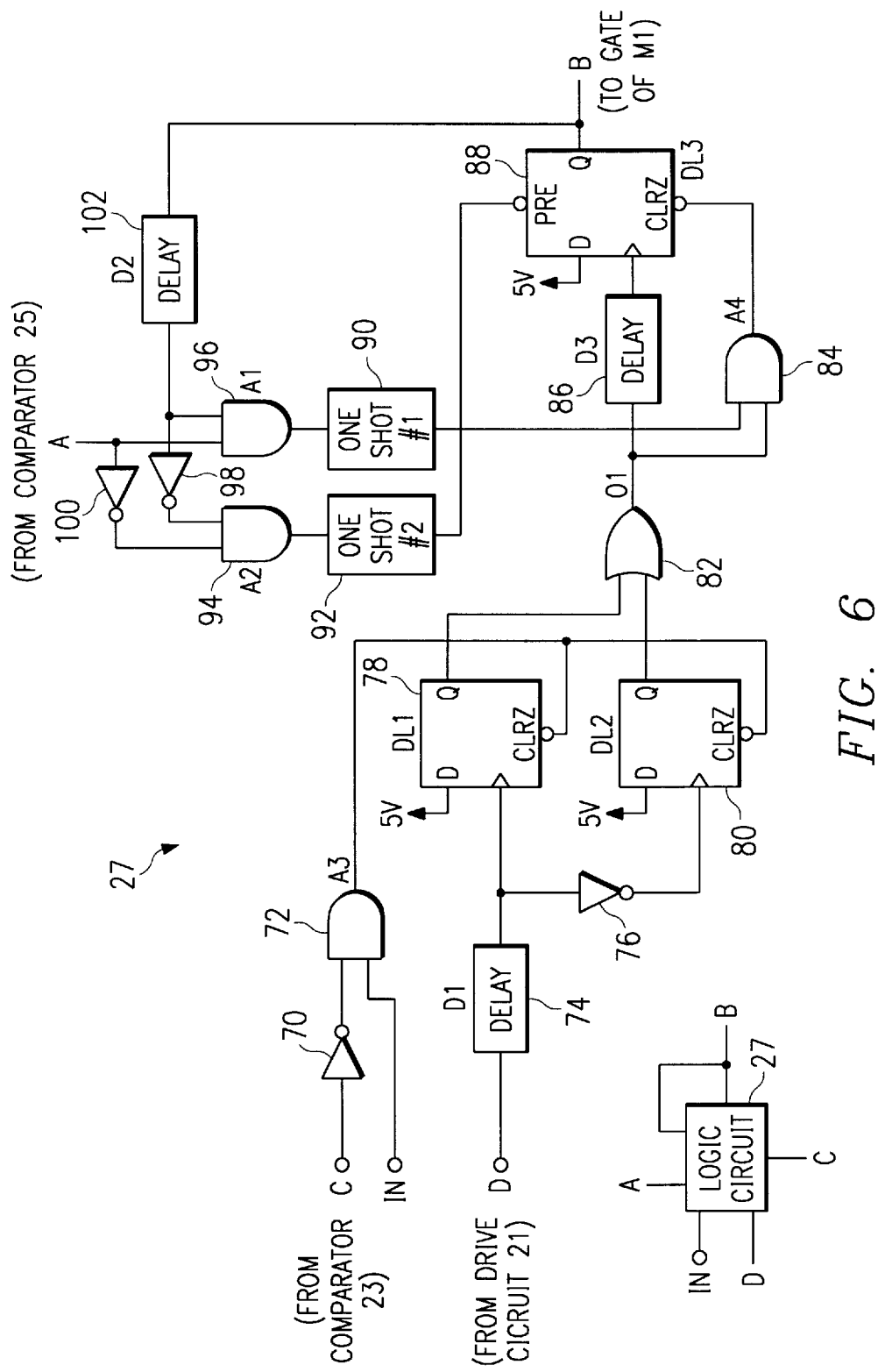
FIG. 6 is a logic diagram illustrating logic circuit 27 of FIGS. 2, 3 and 4.

FIG. 6 is a schematic diagram illustrating logic circuit 27 of FIGS. 2, 3 and 4. Logic circuit 27 has a plurality of D-type latches, DL1, DL2, and DL3, AND gates, A1, A2, A3, and A4, delay elements, D1, D2, and D3, and other logic circuit elements coupled together to provide appropriate control as discussed in this specification.

FIG. 7 is a prior art voltage waveform diagram illustrating the voltage waveform across EL load $C_L$. Because the RMS voltage across EL load $C_L$ is directly proportional to the luminance of the backlight load, FIG. 7 also provides an indication of the luminance and therefore the efficiency of prior art boost regulator circuit 10 of FIG. 1.

Figure 7A:
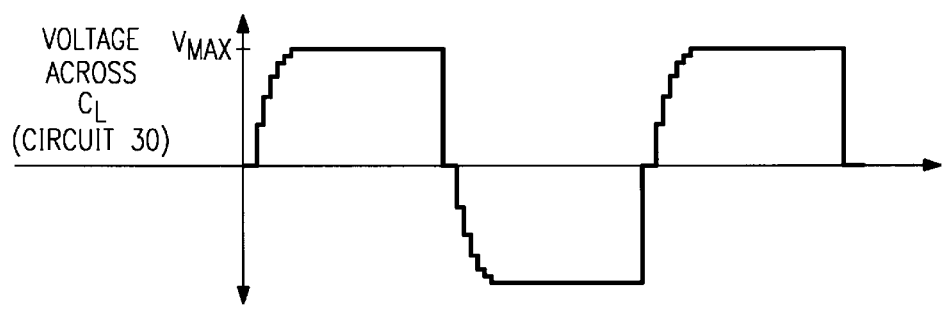
FIG. 7a is a timing diagram illustrating the voltage waveform across an EL load, $C_L$, over time for an embodiment of the invention, improved boost regulator circuit 30 of FIG. 2.

FIG. 7a is a voltage waveform diagram illustrating the voltage waveform across EL load $C_L$ as produced by the circuit 30 of FIG. 2. As in FIG. 7, since the RMS voltage across EL load $C_L$ is directly proportional to the luminance of the backlight load, the voltage waveform provides an indication of the luminance and therefore the efficiency of boost regulator circuit 30 of FIG. 2.

Figure 8:
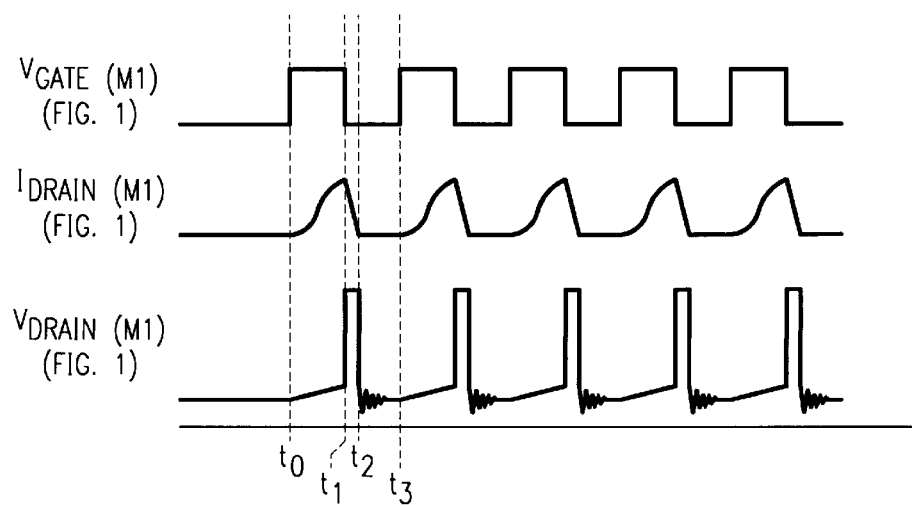
FIG. 8 is a timing diagram illustrating voltage and current waveforms within prior art boost regulator circuit 10 of FIG. 1.

FIG. 8 is a prior art timing diagram illustrating voltage and current waveforms of various nodes in prior art boost regulator circuit 10 of FIG. 1. Specifically, FIG. 8 illustrates the voltage waveforms at the gate and drain of M1 over time and a current waveform at the drain of M1 over time.

Figure 8A:
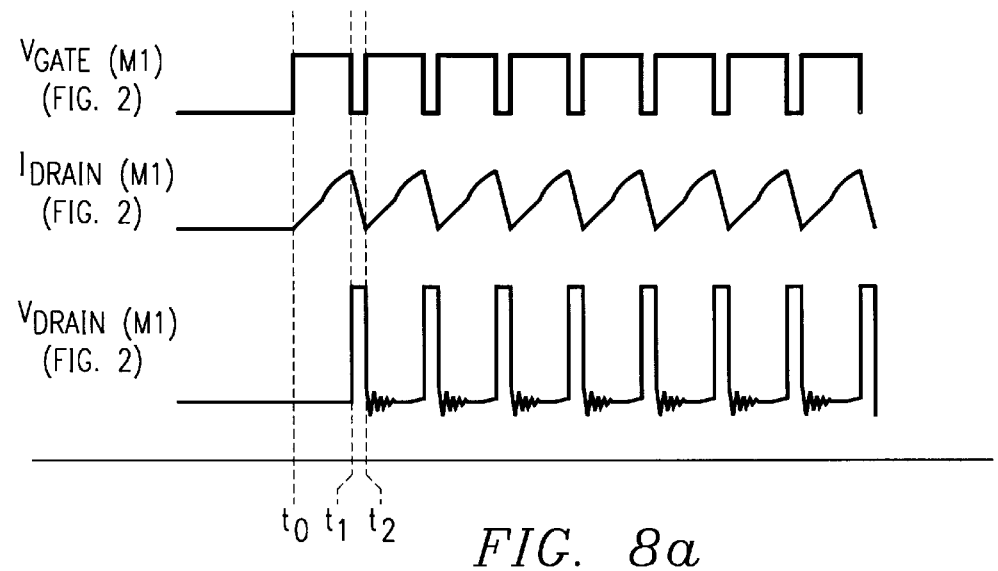
FIG. 8a is a timing diagram illustrating voltage and current waveforms within improved boost regulator circuit 30 of FIG. 2.

FIG. 8a is a timing diagram illustrating voltage and current waveforms of various nodes in improved boost regulator circuit 30 of FIG. 2. Specifically, FIG. 8a illustrates the voltage waveforms at the gate and drain of M1 over time and a current waveform at the drain of M1 over time.

Figure 10:
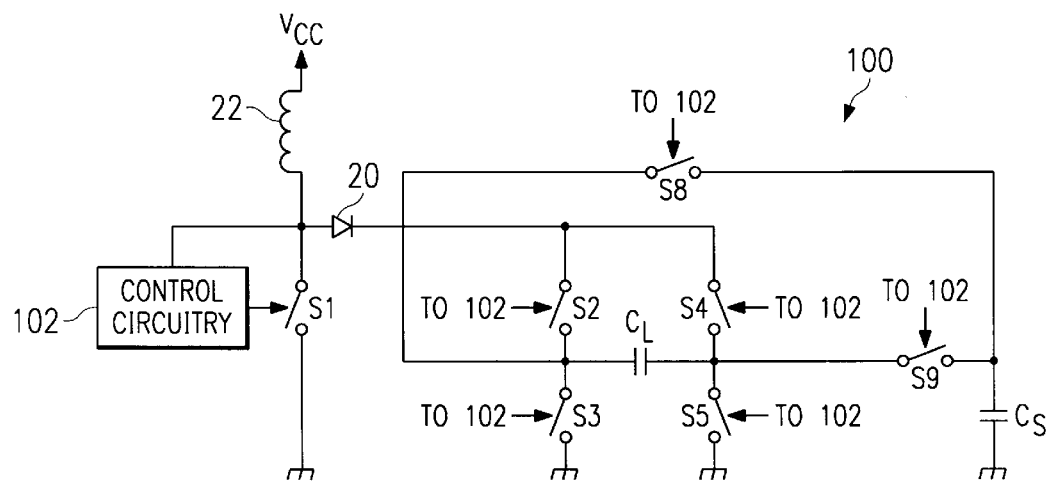
FIG. 10 is a combined block/schematic diagram 100 illustrating another embodiment of the invention.

FIG. 10 is a combined block/schematic diagram illustrating another alternative embodiment of the invention, a boost regulator circuit 100. Circuit 100 has a control circuit 102 coupled to a drive switch S1 which is connected in series with inductor 22 and circuit ground potential. A diode 20 is coupled between S1 and an H-bridge circuit composed of switches S2, S3, S4 and S5. H-bridge circuit is operable to drive EL load $C_L$ bi-directionally. Transfer circuitry is composed of switches S8 and S9 are is coupled between EL load $C_L$ and a storage capacitor $C_S$. Circuit 100 of FIG. 10 advantageously provides for reduced power consumption by transferring energy stored in EL load $C_L$ when the H-bridge circuit is switching the direction of load drive.

Figure 11:
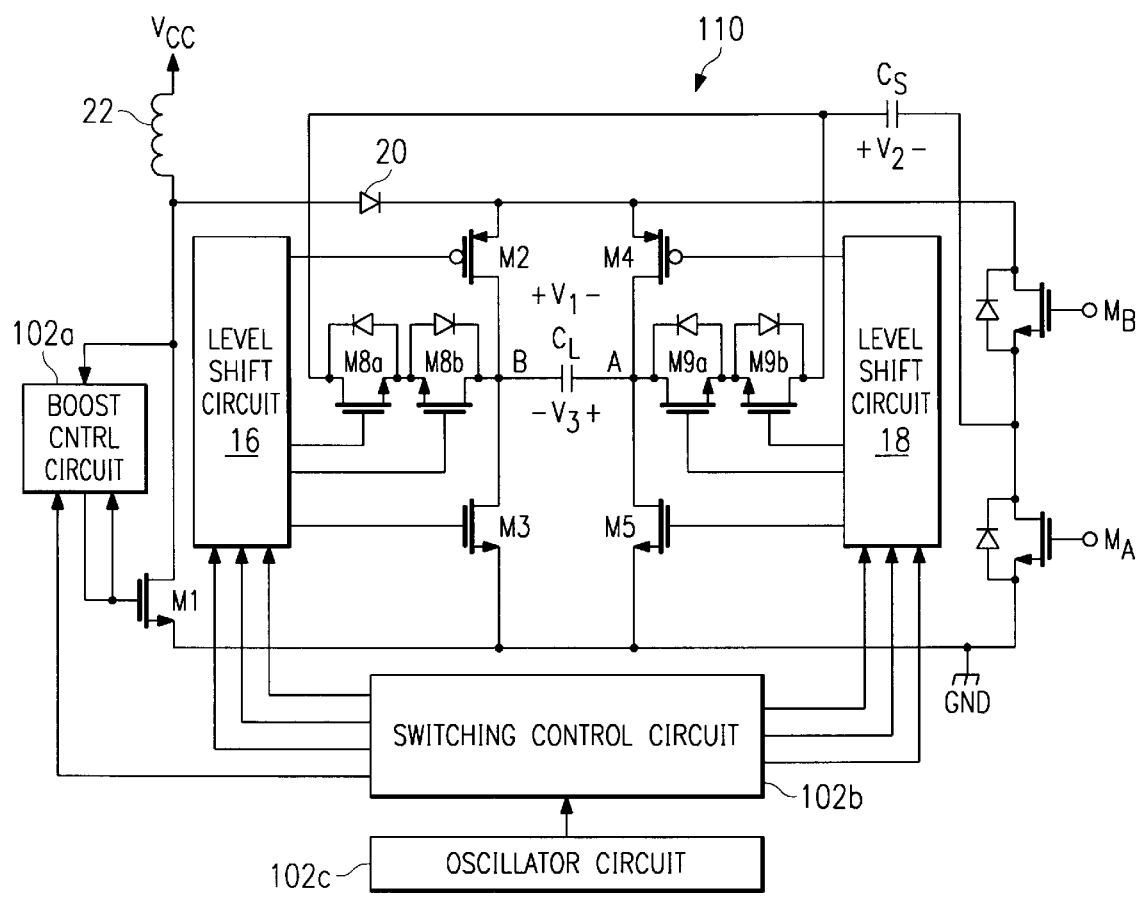
FIG. 11 is a combined block/schematic diagram 110 illustrating yet another embodiment of the invention.

FIG. 11 is a combined block diagram/circuit diagram 110 illustrating another feature of the invention. Circuit 110 advantageously recovers the energy stored in EL load $C_L$ before polarity transition by diverting energy in EL load $C_L$ to a storage capacitor $C_S$. Although storage capacitor $C_S$ is utilized in this particular embodiment, any energy storage component would fall within the scope of this invention.

FIG. 11 illustrates an improved boost regulator circuit 110. Circuit 110 has a drive transistor M1 coupled in series with inductor 22 between a supply voltage potential Vcc and a circuit ground potential. A diode 20 has an anode connected to M1 and a cathode connected to an H-bridge circuit composed of transistors M2, M3, M4, M5 and EL load $C_L$. Series, source-coupled transistors M8a and M8b are connected between one end of EL load $C_L$ and storage capacitor $C_S$ and another pair of series, source-coupled transistors M9a and M9b are connected between the other end of EL load $C_L$ and storage capacitor $C_S$. Storage capacitor $C_S$ is coupled between transistors M8a and M9b and the drain of transistor $M_A$. Control circuitry is composed of boost regulator circuit 102a, switching control circuit 102b and oscillator circuit 102c. Boost control circuit 102a is connected to a gate terminal of M1. Switching control circuit 102b is coupled to the gate terminals of M2, M3, M4 and M5 through level shift circuits 16 and 18 to control the direction in which EL load $C_L$ is driven. Switching control circuit 102b is also connected to control terminals of transistors M8a, M8b, M9a and M9b to control the diversion of energy stored in EL load $C_L$ to storage capacitor $C_S$ before polarity transition of EL load $C_L$. Improved boost regulator circuit 110 drives EL load $C_L$ more efficiently than prior art boost regulator circuit 10 by monitoring the voltage across inductor 22 and driving M1 in response to the monitoring of those voltages.

Figure 12:
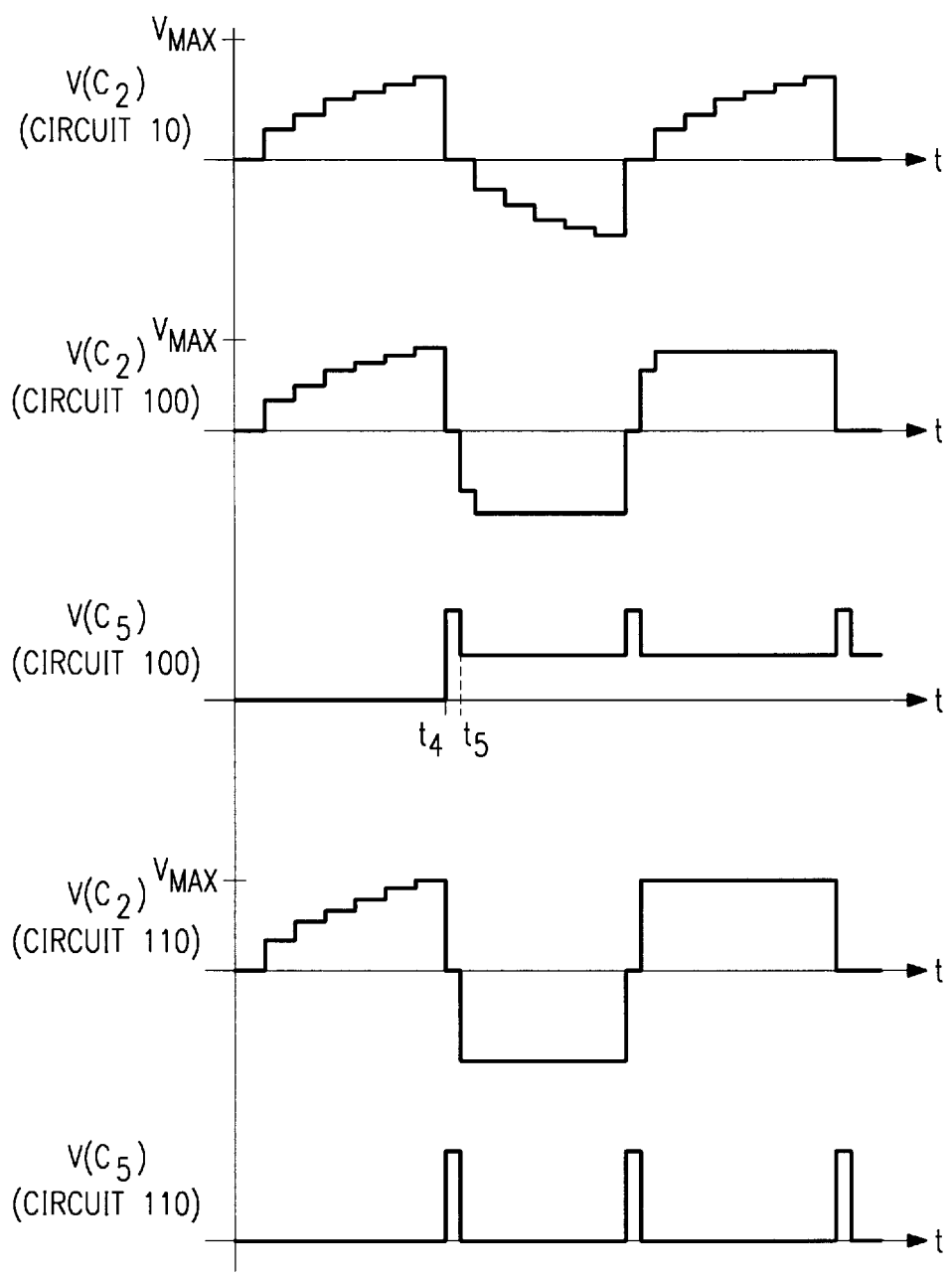
FIG. 12 is a series of timing diagrams illustrating the improved efficiency of circuits 100 and 110 of FIGS. 10 and 11 over prior art circuit 10 of FIG. 1.

FIG. 12 is a series of timing diagrams illustrating the improved efficiency of boost regulator circuits 100 and 110 of FIGS. 10 and 11 over prior art circuit 10 of FIG. 1.

Improved boost regulator circuit 30 of FIG. 2 operates in the following manner and will be discussed in conjunction with FIG. 8a. At time $t_0$ logic circuit 27 outputs a digital high value to the gate of transistor M1 thus turning M1 on. With M1 conducting, the current through inductor 22 will rise approximately linearly until time $t_1$. The time $t_1$ is the time when the inductor begins to go into saturation. An inductor in saturation will not be efficient in storing energy because energy stored in an inductor is equal to $I^2L$ and the inductance, L, begins to drop when the inductor begins to saturate as seen in FIG. 9a. Also, if inductor 22 is allowed to go to its resistive current limit, no increase in current (I) can be achieved for additional conduction through M1. In addition, the node voltage at the drain of M1 rises above $V_{REF2}$. $V_{REF2}$ may be set by the designer to maximize the efficiency of the design depending upon the type of inductor being driven). At time $t_1$ logic circuit 27 goes low thus turning M1 off. At that moment, an inductive flyback occurs at the drain (node voltage) of M1 because inductor 22 cannot instantaneously become an open circuit. The energy stored in inductor 22 ($\frac{1}{2}[LI^2]$) is transferred through diode 20 and drive circuit 21 to EL load $C_L$. The energy transfer to EL load. $C_L$ continues until time $t_2$ when the current in inductor 22 has gone to zero. The drain voltage (or node voltage) of M1 is then at Vcc. There will be undershoot at the drain of M1 due to ringing caused by an LC resonator circuit, where C is contributed by the parasitic capacitance from M1. Second comparator 25 improves the efficiency of boost regulator circuit 30 of FIG. 2 over prior art circuit 10. When the node voltage at the drain of M1 falls below the predetermined voltage value, $V_{REF2}$ (at time $t_2$ in FIG. 8a), second comparator 25 triggers, causing its output to go low. Logic circuit 27, in response to second comparator 25 going high, immediately turns M1 back on, thereby quickly repeating the process of storing energy in inductor 22 and transferring that energy to EL load $C_L$. This step is in stark contrast to prior art circuit 10 which blindly drives transistor M1 without regard to the state of inductor 22. Boost regulator circuit 30 advantageously begins storing energy in inductor 22 as soon as is possible (immediately after the energy in inductor 22 has been transferred to EL load $C_L$) thereby eliminating the "dead time" between time $t_2$ and $t_3$ in prior art FIG. 8 where nothing is happening. Because boost regulator circuit 30 immediately turns M1 back on after the inductive flyback of the node voltage at the drain of M1 (at time $t_2$ of FIG. 8a), the energy transfer to EL load $C_L$ occurs more quickly as illustrated in FIG. 7a. Each transfer of energy form inductor 22 to EL load $C_L$ may be considered an energy storage mode. Therefore, boost circuit 30 of FIG. 2 produces a waveform across EL load $C_L$ that approximates a square wave (see FIG. 7a) while prior art circuit 10 produces a waveform that approximates a triangular wave or sawtooth waveform (see FIG. 7). Also, because prior art circuit 10 blindly drives transistor M1, when transistor M1 is on, the inductor gets driven to currents which exceed the saturation point of inductor 22, thereby wasting power in the inductor. This spent power does not correspond to any significant additional stored energy in inductor 22.

As successive energy transfers occur from inductor 22 to EL load $C_L$, a second node voltage across EL load $C_L$ increases. When the node voltage across EL load $C_L$ reaches a predetermined voltage, $V_{REF1}$ (also labelled as $V_{MAX}$ in FIG. 7a) first comparator 23 triggers and its output goes high, which feeds logic circuit 27. The triggering of first comparator 23 may be considered an indication signal to logic circuit 27. When the output of first comparator 23 goes high, logic circuit 27 turns transistor M1 off thereby saving power. Therefore circuit 30 performs the same number of energy transfers as prior art circuit 10 and therefore dissipates approximately the same amount of power. However, since the RMS voltage of circuit 30 is substantially greater than the RMS voltage of circuit 10 (as clearly seen comparing FIG. 7 and FIG. 7a), improved boost regulator circuit 30 provides substantially greater luminance than prior art circuit 10 while dissipating less power and is therefore more efficient. Additionally, circuit 30 could be modified by lowering predetermined voltage, $V_{REF1}$, such that M1 turns off when a lower node voltage exists across EL load $C_L$. In this case, fewer energy transfers would be needed and circuit 30 would provide the same luminance as prior art circuit 10 while dissipating even less power.

Second predetermined voltage, $V_{REF2}$, is set to a value that ensures when inductor 22 saturates and the current increases greatly in inductor 22, thereby causing the node voltage across inductor 22 to increase due to the winding resistance of inductor 22, second comparator 25 will trigger and cause logic circuit 27 to turn off M1 and thereby transfer the energy from the inductor 22 to EL load $C_L$. Like first comparator 23, the triggering of second comparator 25 may be considered an indication signal to logic circuit 27. This will ensure that an efficient transfer of energy will be delivered to EL load $C_L$.

Second predetermined voltage, $V_{REF2}$, is also set to trigger second comparator 25 high when the node voltage at the drain of M1 flies back when switched. After flyback, the node voltage at the drain of M1 falls, and upon failing below $V_{REF}$ second comparator 25 triggers high. Therefore second comparator 25 performs two functions. For example if inductor 22 were to saturate at 1V, $V_{REF2}$ could be set at 1V, thereby causing second comparator to trip and prevent inductor 22 from saturating. Additionally, when M1 turns off and its drain experiences inductive flyback, when the drain of M1 falls below 1V, second comparator 25 triggers high causing M1 to turn back on and thereby efficiently transfer energy to EL load $C_L$.

The result of improved boost regulator circuit 30 of FIG. 2 is that circuit 30 monitors the node voltages at the drain of M1 and thereby immediately repeating the energy transfer process and monitoring the current in inductor 22 to ensure that inductor 22 does not excessively saturate and monitors the node voltage across EL load $C_L$ to ensure M1 discontinues switching after reaching a predetermined maximum voltage, thereby ensuring maximum energy transfer from inductor 22 to EL load $C_L$.

FIG. 3 is a boost regulator circuit 40 illustrating in greater detail an embodiment for drive circuit 21 of FIG. 2. In FIG. 3 transistors M2, M3, M4 and M5 along with level shift circuits 16 and 18 form an H-bridge type circuit drive configuration. Circuit 40 illustrates in detail a particular method of driving EL load $C_L$ bi-directionally. This would constitute one example of drive circuit 21 of FIG. 2. An oscillator circuit 12 operates at a predetermined frequency and is coupled to an H-bridge circuit configuration consisting of transistors M2, M3, M4 and M5. Inverter 24 ensures that only one conduction path is enabled at one time. Therefore, when transistors M2 and M5 are conducting, transistors M3 and M4 are not conducting and vice-versa. Level shift circuits 16 and 18 provide a voltage boost to transistors M2 and M4 to ensure that, when oscillator circuit 12 outputs a digital high voltage value that M2 or M4 is fully off since the gate voltages of M2 and M4 must be within a threshold voltage of their sources which may be greater than Vcc.

Boost regulator circuit 50 of FIG. 4 differs from improved boost regulator circuit 30 of FIG. 2 in that a voltage monitoring circuit 28 uses a zener stack 42 to monitor the voltage across EL load $C_L$, thereby replacing first comparator 23. Also, an integrator circuit 29 is connected between the drain of transistor M1 and logic circuit 27 thereby replacing second comparator 25. When the node voltage across EL load $C_L$ reaches a predetermined voltage (labelled $V_{MAX}$ in FIG. 7a) a zener diode string 42 breaks down, thereby turning a transistor M7 on. Transistors M6 and M7 form a current mirror, wherein the current in M6 is a ratio of M7, wherein the ratio is determined by the relative sizes of transistors M6 and M7. When transistor M6 turns on, its drain is pulled low, thus providing a digital high input to logic circuit 27 through inverter 34. When that input to logic circuit 27 goes high, logic circuit 27 turns drive transistor M1 off so that the energy transfer process is discontinued.

Figure 5A:
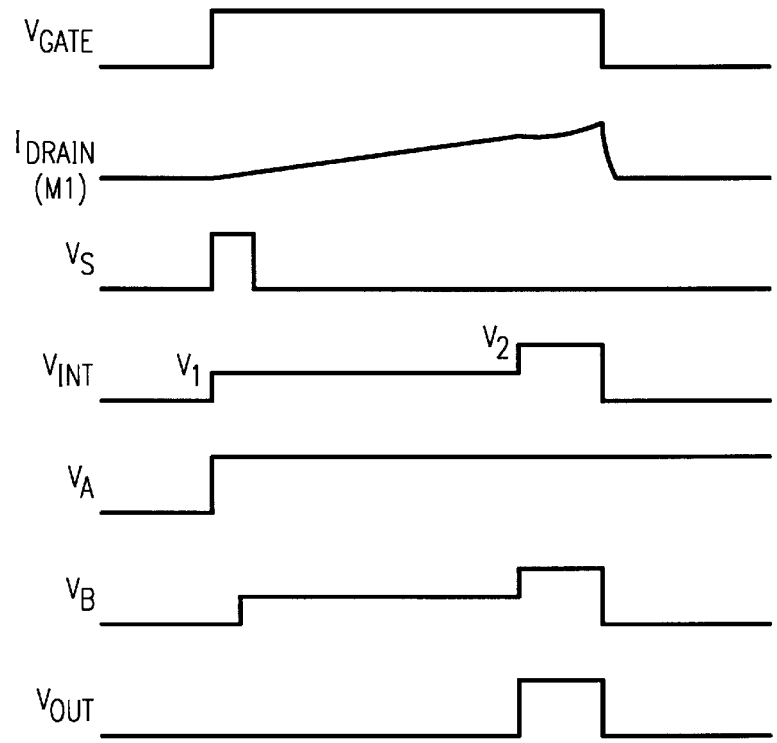
FIG. 5a is a timing diagram illustrating voltage and current waveforms of various circuit nodes within differentiator circuit 29 of FIG. 5.

Differentiator circuit 29 of FIGS. 4 and 5 operates in the following manner. When the gate of M1 is turned on, current ($I_{DRAIN}$) flows through inductor 22. This current also flows through $R_{sense}$, thereby creating a voltage drop across $R_{sense}$. This voltage is then amplified by amplifier A1, which is then propagated to differential amplifier A2. At the time when the gate is turned on, the voltage signal that is seen by A2 goes from zero to a linearly increasing value. This instantaneous change in voltage causes the output of A2 to rise immediately to $V_1$ (see waveforms of FIG. 5a). The output of A2 is fed through MUX to node $V_A$, where the output level of $V_1$ is stored at node $V_A$ via a capacitor $C_A$. This continues until the one-shot circuit time is complete, then the output of A2 is switched to node $V_B$. As the current, $I_{DRAIN}$, continues to increase linearly, the output of A2 will not change value, therefore the output of C1 remains low. Once $I_{DRAIN}$ reaches the saturation point of inductor 22, the rate of current rise of $I_{DRAIN}$ changes. This change causes the output of A2 to rise to a higher level, $V_2$. This higher level causes node $V_B$ to become higher than $V_A$, which results in a high st the output of comparator C1 . When the gate of M1 is turned off, A1 and nodes $V_A$ and $V_B$ are reset to zero.

Logic circuit 27 of FIG. 6 has been described in terms of its operation with FIGS. 2, 3 and 4. Logic circuit 27 obeys the truth table listed below:

TABLE 1

| IN | A | C | D | B (present state) | B (next state) |
|---|---|---|---|---|---|
| 0 | X | X | X | 0 | 0 |
| 1 | X | 1 | X | 0 | 0 |
| 1 | 0 | 0 | 0 | 0 | 1 |
| 1 | 0 | 0 | 1 | 0 | 1 |
| 1 | 1 | 0 | 0 | 1 | 0 |
| 1 | 1 | 0 | 1 | 1 | 0 |
| 1 | 0 | 0 | ↑ | X | 1 |
| 1 | 0 | 0 | ↓ | X | 1 |
| 1 | 1 | 0 | ↑ | X | 1 |
| 1 | 1 | 0 | ↓ | X | 1 | where X = Don't Care,
↑ = drive circuit 21 driving EL load $C_L$ in a first direction, and
↓ = drive circuit 21 driving EL load $C_L$ in a second direction.

It is important to note that the advantages of voltage monitoring circuit 28 and integrator circuit 29 of FIG. 4 illustrate that several techniques may be used to implement the novel load and inductor monitoring methods employed in this invention. It should be understood that other circuits that appropriately monitor EL load $C_L$ and inductor 22 to improve operational efficiency fall within the scope of this patent. Additionally, it should be noted that the advantages of monitoring EL load $C_L$ and inductor 22 in FIG. 4 may also be incorporated with the embodiment of FIG. 2 which immediately repeats the energy transfer process as soon as the energy transfer from inductor 22 to EL load $C_L$ is complete. Any combination or permutation of the novel improvements of circuits 30, 40 and 50 fall within the scope of this invention.

A functional description of FIG. 10 now follows. Assuming an initial condition that switches S2 and S5 are closed such that the voltage across EL load $C_L$ is increasing in a first polarity, control circuit 102 drives switch S1 repeatedly on and off until the voltage across EL load $C_L$ reaches a threshold voltage (Vmax). This is accomplished by control circuitry 102 monitoring the voltage of the cathode of diode 20 which approximates the voltage across EL load $C_L$. Control circuitry 102 then opens switches S2 and S5. Subsequently control circuitry 102 closes switches S8 and S4, and then closes and immediately opens again S1. The voltage increase at the junction between S4 and EL load $C_L$ from the inductive flyback of inductor 22 causes the energy stored in EL load $C_L$ to transfer through S8 to storage capacitor $C_S$. This is illustrated as $t_4$ of FIG. 12 on the timing diagram of $V(C_S)$ of circuit 100. Switch S8 is then opened.

Before switches S3 and S4 are closed to drive EL load $C_L$ in the opposite direction, control circuitry 102 closes switch S9 and S3 and the energy stored in storage capacitor $C_S$ (charge) is transferred through S9 to EL load $C_L$. This is illustrated at the time between $t_4$ and $t_5$ of FIG. 12 on the timing diagram of $V(C_S)$ of circuit 100. All the energy stored in storage capacitor $C_S$ is not transferred back to EL load $C_L$ due to charge equilibrium principles. Control circuitry 102 then opens S9 and subsequently closes S4. Control circuitry 102 then begins repeatedly opening and closing switch S1, thereby boosting the voltage across EL load $C_L$ in the opposite direction. When the voltage across EL load $C_L$ again reaches a threshold voltage (Vmax) control circuitry 102 will open switches S3 and S4. Control circuitry 102 then closes S2 and S9. Subsequently control circuitry 102 quickly closes and opens S1, thereby creating inductive flyback at the junction between S2 and EL load $C_L$. The inductive flyback causes the energy stored in EL load $C_L$ to transfer through S9 to storage capacitor $C_S$. Switch S9 is then opened.

Before switches S2 and S5 are closed to again drive EL load $C_L$ in the opposite direction, control circuitry 102 closes switches S8 and S5 and energy stored in storage capacitor $C_S$ (charge) is transferred through S8 to EL load $C_L$.

The advantage of circuit 100 of FIG. 10 is that circuit 100 does not waste the energy stored in EL load $C_L$ each time it must switch and drive in the opposite direction. Without storage capacitor $C_S$, the energy stored in EL load $C_L$ (½$CV^2$) is dissipated to ground. In circuit 100, however, the energy stored in EL load $C_L$ is not wasted, but rather transferred to storage capacitor $C_S$. When circuit 100 wishes to drive EL load $C_L$ in the opposite direction it first retrieves energy stored in storage capacitor $C_S$, therefore S1 needs to "boost" fewer times, thereby substantially reducing the power consumption of circuit 100.

The operation of circuits 110 of FIG. 11 will now be described. Assuming an initial condition that M2 and M5 are on such that the voltage across EL load $C_L$ is increasing in a first polarity, boost control circuit 102a drives M1 on and off until the voltage across EL load $C_L$ reaches a threshold voltage (Vmax). Boost control circuit 102a monitors the drain of M1 which approximates the voltage across EL load $C_L$ to determine the attainment of Vmax. At that moment, switching control circuit 102b turns M2 and M5 off and turns M4 on. Further, switching control circuit 102b turns M8a off and M8b on. Boost control circuit 102a then switches M1 on and off again thereby creating a voltage flyback at node A (because M4 is on). The voltage increase at node B causes the diode across M8a (the diode may be implicit within the device structure of M8a) to forward bias and the charge across EL load $C_L$ is transferred through M8a (its diode) and M8b (which is on) to storage capacitor $C_S$, thereby creating a voltage ($V_2$) across storage capacitor $C_S$. After transfer is complete, switching control circuit 102b turns M8b off. The diode across M8a prevents energy leakage back to EL load $C_L$ from storage capacitor $C_S$.

The charge that existed across EL load $C_L$ now is stored in storage capacitor $C_S$. To utilize the stored energy, switching control circuit 102b turns M3 on and M4 off. Switching control circuit 102b then turns M9b on and the energy stored in storage capacitor $C_S$ transfers through M9b and the diode across M9a (the diode may be implicit within the device structure of M9a) and finally across EL load $C_L$. This effectively places the energy that used to be stored in EL load $C_L$ in a first polarity ($V_1$) to be stored in EL load $C_L$ in a second polarity ($V_3$) to be driven in the opposite direction. In this manner, the energy in EL load $C_L$ is not wasted, but instead saved in storage capacitor $C_S$ and placed upon EL load $C_L$ in a second polarity as an initial condition for driving EL load $C_L$ in the opposite direction. Circuit 110 of FIG. 11 operates similarly to save energy in EL load $C_L$ when again switching the direction of drive for the load.

Circuit 110 also has transistors $M_A$ and $M_B$ which provide an improvement over circuit 100 of FIG. 10. After energy has been transferred from EL load $C_L$ to storage capacitor $C_S$ it is desired to transfer the energy back to EL load $C_L$ in the opposite polarity to initiate drive in the opposite direction. If transfer circuitry (transistors M8a, M8b, M9a and M9b) simply activate to allow transfer of energy not all the energy in storage capacitor $C_S$ will transfer to EL load $C_L$ due to charge equilibrium principles which are well known by those skilled in the art. Transistors $M_A$ and $M_B$ allow all the energy stored in storage capacitor $C_S$ to be transferred to EL load $C_L$, thereby providing even greater circuit operating efficiency.

When energy is being transferred to storage capacitor $C_S$, transistor $M_A$ is on and transistor $M_B$ is off, thereby coupling the negative terminal of storage capacitor $C_S$ to ground. After energy is transferred to storage capacitor $C_S$ and it is desired to transfer energy back to EL load $C_L$ in an opposite polarity, $M_A$ is turned off and $M_B$ is turned on. Boost control circuit 102a then pulses M1 on and off, thereby creating an inductive flyback voltage at the negative terminal of storage capacitor $C_S$. The flyback voltage at the negative terminal of storage capacitor $C_S$ provides a boost to transfer all the energy from storage capacitor $C_S$ to EL load $C_L$.

Although the invention has been described with reference to the preferred embodiment herein, this description is not to be construed in a limiting sense. Various modifications of the disclosed embodiment as well as other embodiments of the invention, will become apparent to persons skilled in the art upon reference to the description of the invention. It is therefore contemplated that the appended claims will cover any such modifications or embodiments as fall within the true scope of the invention.

We claim:

1. A boost regulator circuit, comprising:
   a first energy storage component;
   means for initiating and discontinuing energy storage in the first energy storage component;
   a capacitive load;
   a bi-directional drive circuit coupled to the first energy storage component, the means for initiating and discontinuing energy storage and the capacitive load, wherein the energy is transferred from the first energy storage element to the capacitive load through the drive circuit, thereby creating a voltage across the capacitive load having a first polarity when driving the capacitive load in a first direction and creating a voltage across the capacitive load having a second polarity when driving the capacitive load in a second direction;
   a second energy storage component; and
   means for transferring energy between the capacitive load and the second energy storage component, wherein when the voltage having a first polarity across the capacitive load reaches a predetermined voltage it transfers the energy in the capacitive load to the second energy storage component and subsequently transfers the energy back to the capacitive load in the second polarity, thereby conserving energy and substantially reducing power consumption of the boost regulator circuit.

2. The boost regulator circuit of claim 1, wherein the means for initiating energy storage in the first energy storage component comprises a transistor.

3. The boost regulator circuit of claim 1, wherein the capacitive load comprises an electroluminescent backlight.

4. The boost regulator circuit of claim 1, wherein the first energy storage component comprises an inductive load.

5. The boost regulator circuit of claim 1, wherein the second energy storage component is a capacitor.

6. The boost regulator circuit of claim 1, wherein the bi-directional drive circuit is an H-bridge circuit.

7. The boost regulator circuit of claim 6, wherein the H-bridge circuit comprises:
   a first MOS transistor;
   a second MOS transistor connected in series with the first MOS transistor;
   a third MOS transistor; and
   a fourth MOS transistor connected in series with the third MOS transistor, and wherein the first and second MOS transistors and connected in parallel with the third and fourth MOS transistors.

8. The boost regulator circuit of claim 1, wherein the means for transferring energy between the capacitive load and the second energy storage component comprises;
   a transfer circuit coupled between the capacitive load and the second energy storage component; and
   control circuitry connected to the transfer circuit and the bi-directional drive circuit, wherein the control circuitry is operable to monitor the bi-directional drive circuit and when the bi-directional drive circuit has discontinued driving the capacitive load in a first direction activate the transfer circuit, thereby creating a path to transfer energy stored in the capacitive load to the second energy storage component, and wherein when the bi-directional drive circuit is ready to drive the capacitive load in a second direction the control circuitry is operable to activate the transfer circuit, thereby creating a path to transfer energy stored in the second energy storage component to the capacitive load.

9. The boost regulator of claim 8, further comprising boost circuitry coupled to the second energy storage component, wherein the boost circuitry is activated when energy stored in the second energy component is to be transferred back to the capacitive load, and wherein the boost circuitry places a voltage on a node of the second energy component nearest ground potential, thereby effectuating a complete transfer of all energy stored in the second energy storage component.

* * * * *